United States Patent
Uda et al.

(10) Patent No.: US 12,215,877 B2
(45) Date of Patent: Feb. 4, 2025

(54) AIR CIRCULATION DEVICE

(71) Applicant: DAIKIN INDUSTRIES, LTD., Osaka (JP)

(72) Inventors: Masafumi Uda, Osaka (JP); Yousuke Imai, Osaka (JP); Keita Kawahara, Osaka (JP); Kiichirou Satou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 346 days.

(21) Appl. No.: 17/696,719

(22) Filed: Mar. 16, 2022

(65) Prior Publication Data
US 2022/0205658 A1    Jun. 30, 2022

Related U.S. Application Data

(63) Continuation of application No. PCT/JP2020/036660, filed on Sep. 28, 2020.

(51) Int. Cl.
*F24F 11/00* (2018.01)
*F24F 7/007* (2006.01)
*F24F 120/12* (2018.01)

(52) U.S. Cl.
CPC .......... *F24F 11/0001* (2013.01); *F24F 7/007* (2013.01); *F24F 2120/12* (2018.01)

(58) Field of Classification Search
CPC .... F24F 11/0001; F24F 7/007; F24F 2120/12; F24F 11/65; F24F 11/74; F24F 1/0011; F24F 7/06; F24F 13/06; F24F 2221/17; F24F 11/89; F24F 13/02; F24F 2120/10; Y02B 30/70; F15D 1/009; B05B 7/0012

USPC .......................................................... 454/229
See application file for complete search history.

(56) References Cited

U.S. PATENT DOCUMENTS

| | | |
|---|---|---|
| 2009/0210193 A1 | 8/2009 | Nagase |
| 2015/0328960 A1 | 11/2015 | Castillo |

FOREIGN PATENT DOCUMENTS

| | | |
|---|---|---|
| EP | 3 144 598 A1 | 3/2017 |
| JP | 7-332750 A | 12/1995 |
| JP | 11-184420 A | 7/1999 |
| JP | 2000-121139 A | 4/2000 |
| JP | 2000-176339 A | 6/2000 |
| JP | 2004-53102 A | 2/2004 |
| JP | 2009-174830 A | 8/2009 |
| JP | 2011-146137 A | 7/2011 |
| JP | 2015-59731 A | 3/2015 |
| JP | 2017-53592 A | 3/2017 |
| JP | 2018-110667 A | 7/2018 |

OTHER PUBLICATIONS

International Preliminary Report of corresponding PCT Application No. PCT/JP2020/036660 dated Apr. 14, 2022.

(Continued)

*Primary Examiner* — Allen R. B. Schult
*Assistant Examiner* — Illiam C Weinert
(74) *Attorney, Agent, or Firm* — Global IP Counselors, LLP

(57) ABSTRACT

An air circulation device includes a suction section configured to suck indoor air, and a blower section configured to blow the air sucked by the suction section into a room. The air is in a form of a vortex ring. The air circulation device is operable in at least a first mode in which the vortex ring blown therefrom reaches a wall surface of the room.

8 Claims, 5 Drawing Sheets

(56) References Cited

OTHER PUBLICATIONS

European Search Report of corresponding EP Application No. 20 87 2326.2 dated Jul. 21, 2023.
International Search Report of corresponding PCT Application No. PCT/JP2020/036660 dated Dec. 1, 2020.
Japan Aerospace Exploration Agency; Japanese Manned Space Technology brought by Development and Operation of International Space Station (ISS), Japanese Experimet Module KIBO, Chapter 9 Life Support Technologies, JAXA-SP-12-15, pp. 84-95, Mar. 2013, Japan.

AIR CIRCULATION DEVICE

CROSS-REFERENCE TO RELATED APPLICATIONS

This is a continuation of International Application No. PCT/JP2020/036660 filed on Sep. 28, 2020, which claims priority to Japanese Patent Application No. 2019-180378, filed on Sep. 30, 2019. The entire disclosures of these applications are incorporated by reference herein.

BACKGROUND

Field of Invention

The present disclosure relates to an air circulation device.

Background Information

Means for circulating air in a space include a method using ducts arranged in the space. For example, JAXA Special Publication (Vol.) JAXA-SP-12-015 "Japanese Manned Space Technology brought by Development and Operation of International Space Station (ISS), Japanese Experiment Module KIBO" discloses that ducts are arranged in a space, which has an air outlet and an air inlet to enable air circulation (e.g., page 87, FIG. 3).

SUMMARY

A first aspect of the present disclosure is directed to an air circulation device that includes a suction section configured to suck indoor air, and a blower section configured to blow the air sucked by the suction section into a room. The air is in a form of a vortex ring. The air circulation device is operable in at least a first mode in which the vortex ring blown therefrom reaches a wall surface of the room.

DETAILED DESCRIPTION OF EMBODIMENTS

First Embodiment

Figure 1:
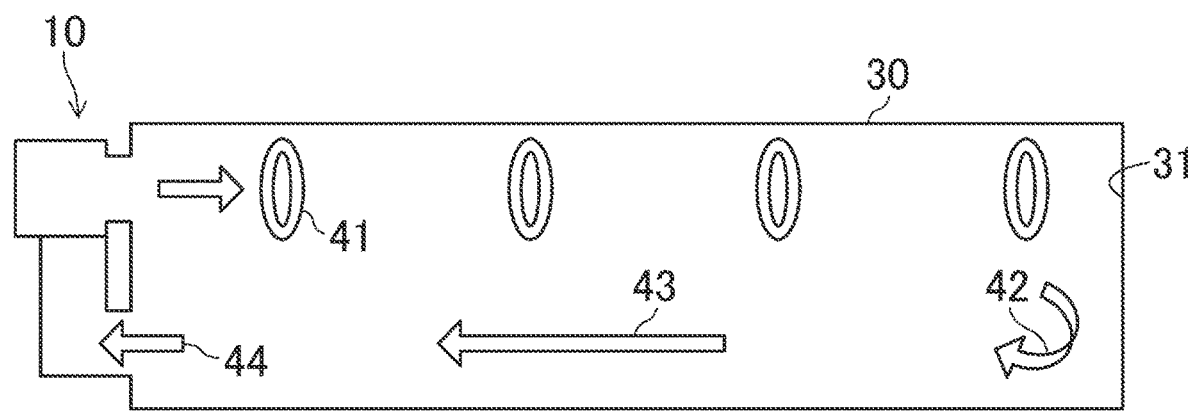
FIG. 1 schematically illustrates circulation of air in the form of a vortex ring, using an air circulation device of the present disclosure operating in a first mode.
Figure 2:
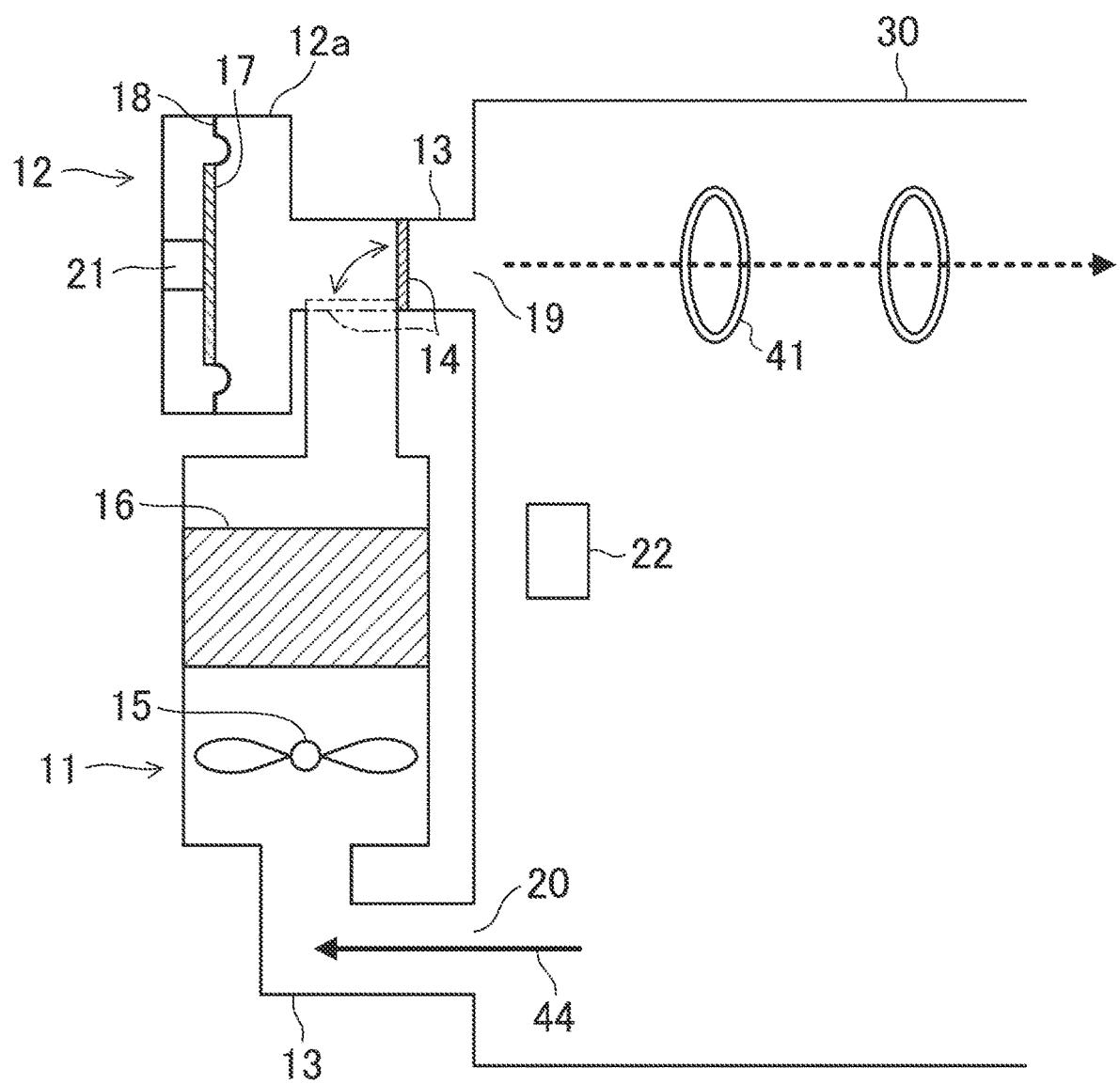
FIG. 2 more specifically illustrates a configuration of the air circulation device illustrated in FIG. 1.
Figure 3:
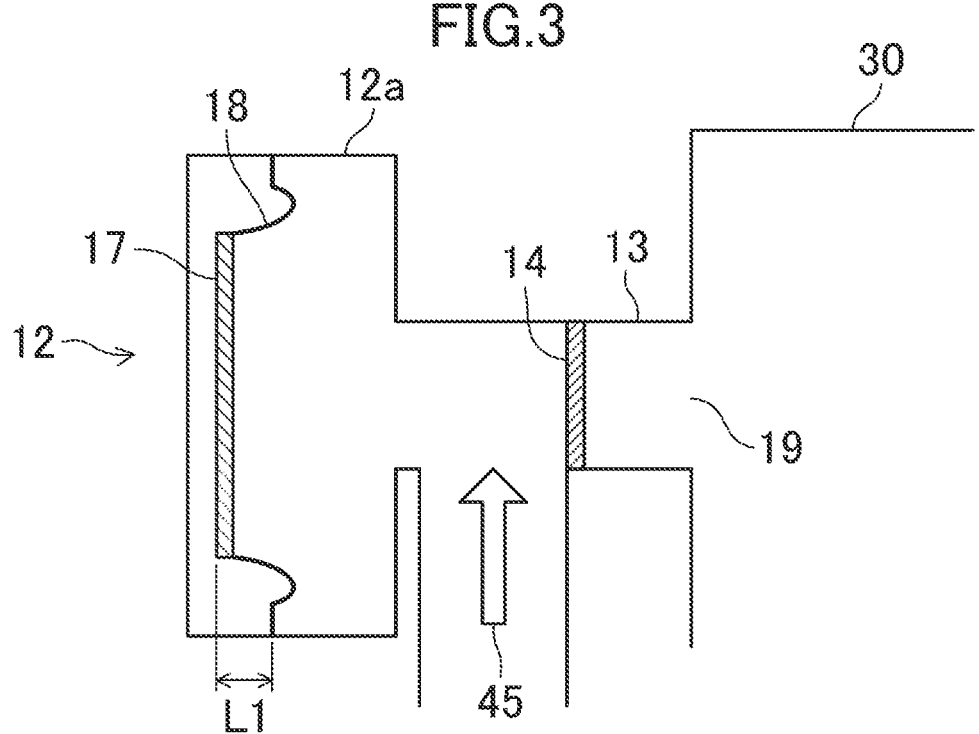
FIG. 3 illustrates formation of a vortex ring by the air circulation device illustrated in FIG. 2.
Figure 4:
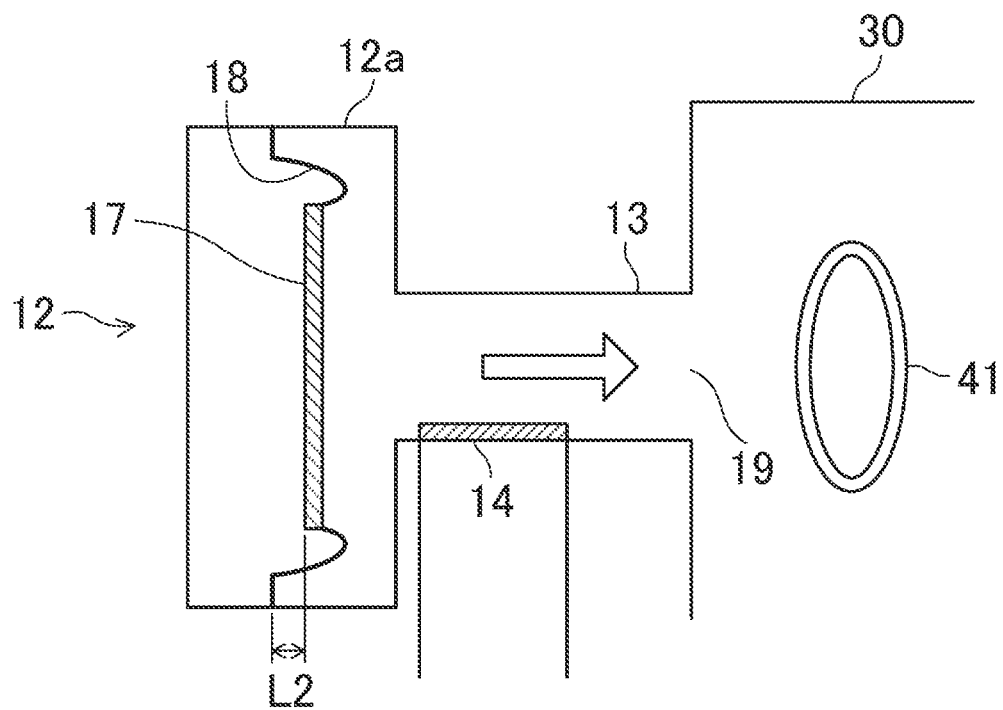
FIG. 4 illustrates formation of a vortex ring by the air circulation device illustrated in FIG. 2.

A first embodiment will be described. FIG. 1 schematically illustrates circulation of air in a space (30) by an air circulation device (10) of this embodiment. FIG. 2 more specifically illustrates the air circulation device (10), and FIGS. 3 and 4 illustrate a blower section (12) in more detail, and are for explaining the formation of a vortex ring.

An air circulation device (10) includes a suction section (11) configured to suck indoor air, and the blower section (12) configured to blow the air sucked by the suction section (11) into a room. The air is in the form of a vortex ring. The air circulation device (10) has at least a first mode that allows the blown vortex ring (41) to reach a wall surface (31) of the room.

The air circulation device (10) sucks air (indoor air) in the space (30) as indicated by an arrow (44), and blows the air as the vortex ring (41) into the space (30). The blown vortex ring (41) reaches the wall surface (31) on the side of the space (30) opposite to the air circulation device (10), and collides with the wall surface (31). This causes the shape of the vortex ring to collapse. As a result, a certain amount of air is conveyed from the air circulation device (10) toward the wall surface (31) facing the air circulation device (10) (from left to right in FIG. 1). Repeatedly blowing the vortex ring (41) allows air to be successively conveyed.

The air in the form of the vortex ring (41) collides with the wall surface (31) and is thus collapsed. The collapsed air is then pushed back from the wall surface (31) toward the air circulation device (10) as indicated by arrows (42) and (43). At least portion of the air pushed back is again sucked into the air circulation device (10) as indicated by the arrow (44).

In the foregoing manner, the air circulation device (10) can circulate the air in the space (30).

The use of the vortex ring (41) allows air to be stably conveyed as a lump. This eliminates the need for arranging ducts for the purpose of air circulation. As a result, this eliminates the need for costs of the ducts and a fan for air circulation, and can reduce the energy consumption for operating the fan as well. In addition, a space required to install ducts may be used for other purposes, such as for residence.

When an air flow is generated by a fan or any other member to circulate air, the air flow becomes excessively strong near the fan and the size of the fan required or the number of revolutions of the fan required increases excessively, which are problems. The generation of a strong air flow may be undesired depending on the intended use of the space (30). The circulation of air in the form of the vortex ring (41) can solve these problems.

Configuration of Air Circulation Device

Next, FIG. 2 more specifically illustrates the air circulation device (10).

The air circulation device (10) is provided between an inlet (20) and an outlet (19) provided for the space (30), and includes the suction section (11) and the blower section (12). The inlet (20), the suction section (11), the blower section, and the outlet (19) are connected together in this order through an air passage (13).

The suction section (11) includes a fan (15) configured to suck air, and an air controller (16) configured to adjust the indoor air quality of the sucked air. The air controller (16) controls, for example, the temperature, humidity, components (e.g., the carbon dioxide concentration), cleanliness (e.g., the amount of fine particles), and other parameters of air.

The air that has its indoor air quality controlled by the air controller (16) is conveyed through the air passage (13) to the blower section (12).

The blower section (12) includes a casing (12a), and is provided with a diaphragm (17) that is positioned in the casing (12a) to face the outlet (19). The diaphragm (17) is attached to the casing (12a) by an elastic supporting member (18). As a result, the diaphragm (17) can move toward and away from the outlet (19) (leftward and rightward in FIG. 2). A linear actuator (21) configured to vibrate the diaphragm (17) is further provided.

Furthermore, a damper (14) that can close the air passage (13) is provided on the way from the diaphragm (17) to the outlet (19). The damper (14) can also move to the position where it blocks air traveling from the suction section (11) toward the blower section (12).

A control unit (22) is further provided. The control unit (22) is configured to control the fan (15), the air controller (16), the damper (14), the linear actuator (21), and other components.

The air controller (16) as described above allows the air sucked thereinto from the space (30) using the fan (15) to be blown, as the vortex ring (41), into the space (30) through motions of the damper (14) and the diaphragm (17). This will be further described with reference to FIGS. 3 and 4.

FIGS. 3 and 4 are enlarged views illustrating the blower section (12) illustrated in FIG. 2 and its surrounding area. However, these figures do not illustrate the linear actuator (21).

In FIG. 3, the damper (14) closes a portion of the air passage (13) directed toward the outlet (19). It is possible for air to move from the suction section (11) to the blower section (12) as indicated h an arrow (45). The diaphragm (17) has moved (been drawn) in a direction remote from the outlet (19).

The damper (14) is moved from this state as illustrated in FIG. 4. Specifically, a portion of the air passage (13) directed from the suction section (11) toward the blower section (12) is closed, and the portion of the air passage (13) directed toward the outlet (19) is opened. Subsequently, the diaphragm (17) is moved (pushed) toward the outlet (19). As a result, air is pushed out of the blower section (12) into the space (30), and is blown as a vortex ring (41). Repeating the states shown in FIGS. 3 and 4 allows the vortex ring (41) to be repeatedly blown into the space (30).

The amount of circulating air can be changed by controlling the volume and generation frequency of the vortex ring (41). The volume of the vortex ring (41) depends on the capacity of the casing (12a) of the blower section (12), the area of the diaphragm (17), and other parameters. The volume of the vortex ring (41) further depends on the range within which the diaphragm (17) moves. The range within which the diaphragm (17) moves means the sum of the distance L1 over which the diaphragm (17) is moved (drawn) in the direction remote from the outlet (19) as illustrated in FIG. 3 and the distance L2 over which the diaphragm (17) is moved (pushed) toward the outlet (19) as illustrated in FIG. 4. As a matter of course, increasing the distances causes an increase in the volume of the vortex ring (41).

In addition to the range within which the diaphragm (17) moves, the moving speed of the diaphragm (17) also affects the vortex ring (41). The volume, moving speed, stability, and other elements of the vortex ring (41) can be changed by controlling the diaphragm (17). In addition, the generation frequency of the vortex ring (41) can be controlled based on the frequency of motion of the diaphragm (17).

The control unit (22) may control the diaphragm (17) as described above. As illustrated in FIG. 2, the control unit (22) may be provided in the space (30), for example.

A sufficient amount of air is required to generate the vortex ring (41). To satisfy the need, the suction section (11) sucks air from the space (30), and supplies the sucked air to the blower section (12). To supply the required amount of air to the blower section (12), the control unit (22) controls the fan (15) and air controller (16) of the suction section (11).

The control unit (22) may be configured to operate the linear actuator (21) configured to automatically vibrate the diaphragm (17), the fan (15), the air controller (16), and other components, in accordance with the amount of circulating air set by a human (e.g., a choice from among specific numerical set values of the amount of circulating air and a plurality of set intensity levels).

Operation Modes of Air Circulation Device

The control unit (22) controls the diaphragm (17) and other components so that the air circulation device (10) is operable in various operation modes. A specific example of each of the operation modes will be described below.

First Mode

The air circulation device (10) of this embodiment has at least a first mode that allows a vortex ring blown therefrom to reach a wall surface of the room. FIG. 1 also shows an operating state of the air circulation device (10) in the first mode. In the first mode, the vortex ring (41) reaches the wall surface (31) on the side of the space (30) opposite to the air circulation device (10).

The vortex ring (41) collapses after moving through the air over a predetermined distance. Thus, the vortex ring (41) blown from the blower section (12) needs to reach the wall surface (31) before collapsing. To satisfy the need, the control unit (22) controls the diaphragm (17) and other components to generate the vortex ring (41) having an adequate moving speed, stability, and other suitable features.

In the first mode, the vortex ring (41) reaches the wall surface (31), so that air near the wall surface (31) is pushed toward the air circulation device (10) as indicated by the arrows (42) and (43). Thus, air can be circulated throughout the space (30).

Second Mode

Figure 5:
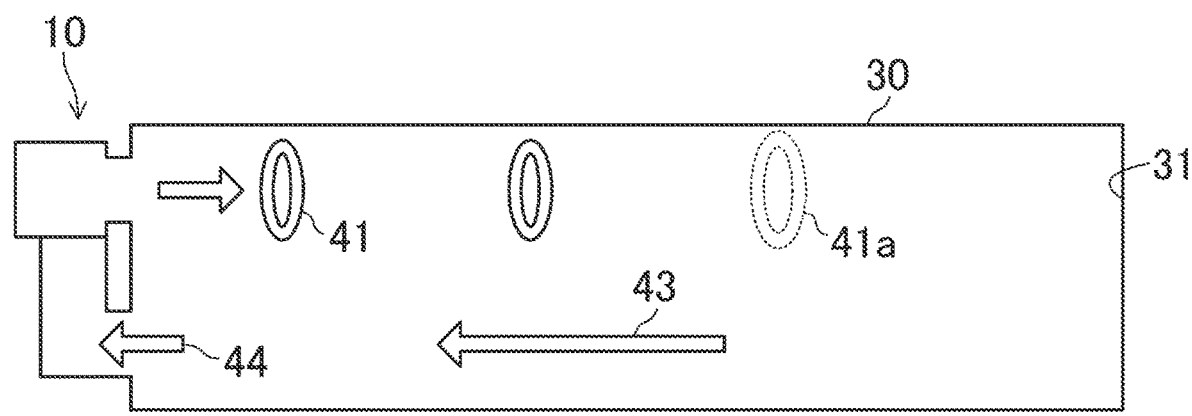
FIG. 5 illustrates a second mode of the air circulation device of the present disclosure.

The air circulation device (10) of this embodiment may have a second mode that allows a vortex ring blown therefrom to disappear before reaching the wall surface of the room. FIG. 5 shows an operating state of the air circulation device (10) in the second mode. In the second mode, a vortex ring (41) disappears before reaching the wall surface (31) on the side of the space (30) opposite to the air circulation device (10). In other words, before reaching the wall surface (31), the vortex ring collapses without maintaining its state. FIG. 5 illustrates a vortex ring (41a) that has collapsed.

In this second mode, air near the wall surface (31) is not or only slightly affected by the vortex ring (41). Thus, a region of the space (30) through which air is not (or hardly) circulated is formed near the wall surface (31).

In a region of the space (30) through which the vortex ring (41) travels, air also flows back toward the air circulation device (10) as indicated by the arrow (43), thereby circulating the air. It may be unnecessary to circulate air to the vicinity of the wall surface (31) depending on the intended use of the space (30), in this case, circulating the air through a necessary region of the space (30) can reduce the energy required to operate the air circulation device (10). The amount of air circulating through a region of the space (30) through which the vortex ring (41) does not travel to the wall surface (31) can also be increased. In addition, it may be recommended that air near the wall surface (31) should not be moved. In this case, the second mode is used preferably.

To generate a vortex ring (41) that does not reach the wall surface (31) to enable the second mode, the control unit (22) merely needs to control e diaphragm (17) and other components of the blower section (12).

Third Mode

Figure 6:
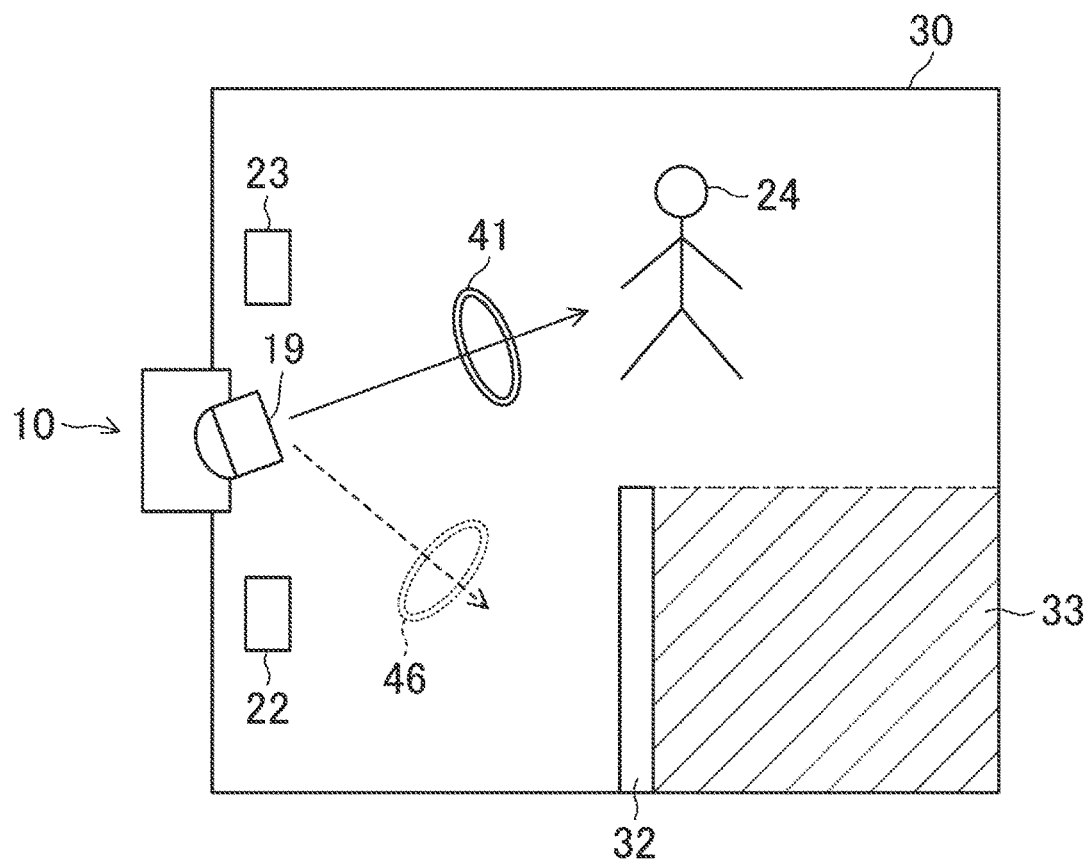
FIG. 6 illustrates a third mode of the air circulation device of the present disclosure.

The air circulation device (10) of this embodiment includes a person detector (23) that detects the position of a person, and has a third mode that allows a vortex ring to be blown toward the person detected by the person detector (23). FIG. 6 illustrates the third mode of the air circulation device (10).

The air circulation device (10) illustrated in FIG. 6 can change the direction of the outlet (19), and can blow a vortex ring (41) into the space (30) in different directions.

The person detector (23) is provided, and is capable of detecting the position of a person (24) present in the space (30). Examples of the person detector (23) that can be used include an infrared sensor and a camera. If a camera is used, a person may be recognized and a position of the person may be specified by image recognition. In particular, using a plurality of cameras enables recognition of the three-dimensional location.

If the person detector (23) detects the position of the person (24), information indicating the position is transmitted to the control unit (22). The control unit (22) changes, and sets, the direction of the outlet (19) such that the vortex ring (41) is blown toward the person (24). This allows the vortex ring (41) to be blown toward the person (24). A vortex ring (46) indicated by a dotted line is an example of a vortex ring blown toward a different location.

The third mode allows the vortex ring (41) to be blown toward the person (24) present at any one of different locations in the space (30), and enables circulation of air at the location where the person (24) is present.

This allows energy requirements to be less than if air is circulated throughout the space (30).

Note that an object to be detected may be something different from a person. In the foregoing description, the vortex ring (41) is blown toward the detected person (24). However, a mode in which the vortex ring (41) is blown toward a location except the detected position of the person (24) or any other object may be provided. Such a mode is also useful if an object with which the vortex ring (41) should be prevented from colliding is present.

Other Embodiments

An example in which only air in the form of the vortex ring (41) is circulated through the space (30) has been described above. However, any other suitable air circulation method may be used in combination.

Suppose that, for example, as illustrated in FIG. 5, an obstacle (32), such as a wall, is present in the space (30). In this case, air in the form of the vortex ring (41) is hardly circulated through a region (33) of the space (30) hidden by the obstacle (32) as viewed from the air circulation device (10). Thus, air may be circulated in the region (33) by any other suitable method, such as through the use of ducts, in one preferred embodiment. Alternatively, a certain circulation of air may be conducted using ducts or any other members, and a circulation of air as the vortex ring (41) may also be conducted as necessary. Such a case also allows the cost and energy requirements to be lower than if air is entirely circulated using ducts and a fan or any other similar member intended to blow air through the ducts.

Circulating air as the vortex ring (41) is particularly useful in a zero-gravity environment, such as a space station, and a low-gravity environment, such as the lunar surface. In the zero-gravity environment, the degree of free convection due to air temperature change is low. This makes it particularly important to force air circulation. Thus, air is circulated in a space station or any other similar space using ducts. In such a case, using the vortex ring (41) for air circulation can downsize, or eliminate the need for, the ducts. This enables space savings. Supplying air only to necessary locations is needed in the zero-gravity environment. Space and energy available in a space station or any other similar space are both limited, Thus, the air circulation device (10) using the vortex ring (41) is useful.

Example in Low Temperature Warehouse

Next, an example in which air circulation devices (10) of the present disclosure are used in a low temperature warehouse (50) will be described with reference to FIG. 7. Shelves (51) are arranged in the low temperature warehouse (50), and articles to be maintained at a temperature lower than or equal to a predetermined temperature are housed in the shelves (51).

A situation where the temperatures of some or all locations in the interior of the low temperature warehouse (50) exceed the predetermined temperature should be avoided. To avoid this situation, the number of air conditioners installed is increased to provide an adequate air conditioning capacity, and the airflow rate is set to be high enough to spread cold air throughout the room, for example. Furthermore, since the shelves (51) may block the flow path of the cold air, the arrangement of air-conditioning apparatuses, the direction of an outlet for cold air, and other elements have also needed to be set to avoid the situation. In addition, the air conditioning is set to allow margin as described above. Thus, the temperature environment is low and severe. In particular, cold air coming into direct contact with an operator has caused the physical burden on the operator.

Figure 7:
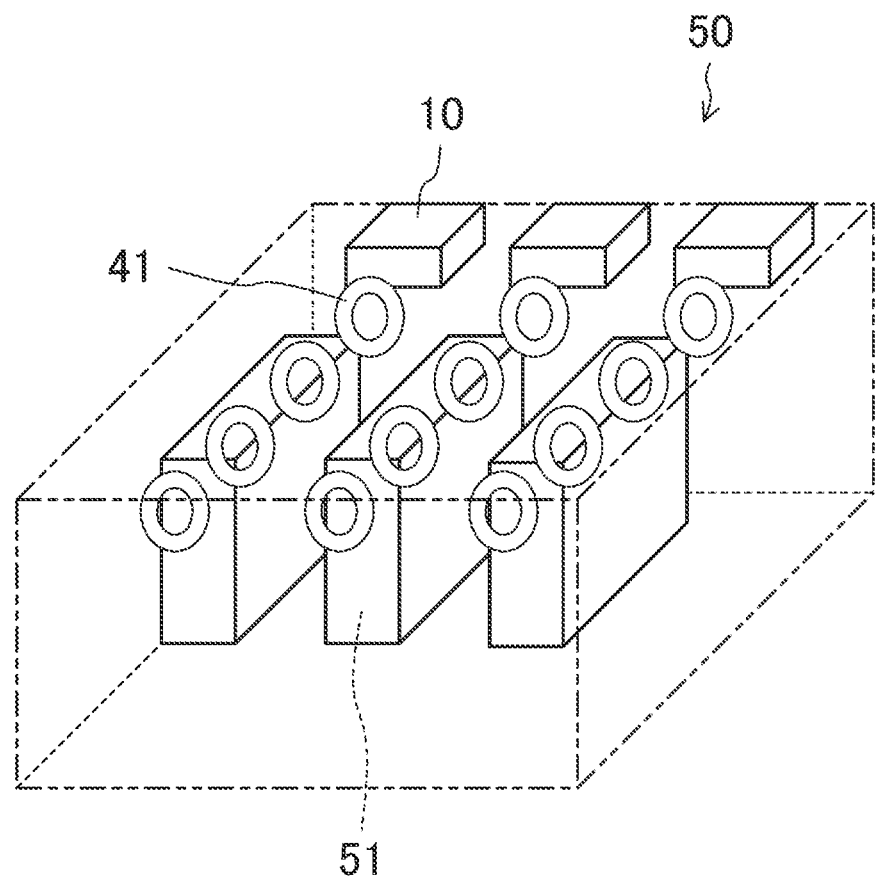
FIG. 7 illustrates an example in which the air circulation device of the present disclosure is used in a low temperature warehouse.

In contrast, in the example illustrated in FIG. 7, the air circulation devices (10) of the present disclosure are used. The air circulation devices (10) each blow cold air as a vortex ring (41), and maintain the interior of the low temperature warehouse (50) at a temperature lower than or equal to the predetermined temperature. As described above, instead of the use of ducts or any other similar members, the use of the vortex ring (41) allows air to be circulated through the space. Adjusting the direction in which the vortex ring (41) is blown, the moving speed of the vortex ring (41), and other elements allows cold air to travel around the shelves (51) so as to be spread throughout the low temperature warehouse (50). This can reduce temperature differences (temperature variations) among locations of the interior of the low temperature warehouse (50), and can thus reduce damage caused to the stocks by the temperature variations.

Cold air can be adequately spread in the low temperature warehouse (50). Thus, the excessive number of air conditioners and operations at an excessive output (airflow rate), for example, are not required. This reduces the initial cost for air-conditioning apparatuses, the operating costs, and energy requirements. Using the third mode can avoid colliding of cold air with an operator in the low temperature warehouse (50). This can reduce the burden on the operator.

While the embodiments have been described above, it will be understood that various changes in form and details can be made without departing from the spirit and scope of the claims. The embodiments and the variations thereof may be combined and replaced with each other without deteriorating intended functions of the present disclosure.

As can be seen from the foregoing description, the present disclosure is useful for an air circulation device.

The invention claimed is:
1. An air circulation device comprising:
   a suction section configured to suck indoor air; and a blower section configured to blow the air sucked by the suction section into a room, the air being in a form of a vortex ring, the air circulation device being operable in at least a first mode in which the vortex ring blown from the air circulation device reaches a wall surface of the room and air of the vortex ring, having reached the wall surface and collapsed, being pushed back toward the suction section, wherein the vortex ring is blown through an outlet into the room, the air circulation device further includes a damper configured to close a portion of an air passage connecting the blower section to the outlet, and the damper is further configured to move to a position in which the damper blocks air traveling from the suction section toward the blower section.

2. The air circulation device of claim 1, wherein the blower section is configured to be capable of changing at least one of a volume of the vortex ring at a time of generation of the vortex ring and a generation frequency of the vortex ring.

3. The air circulation device of claim 2, wherein the air circulation device is operable in a second mode in which the vortex ring blown from the air circulation device disappears before reaching the wall surface of the room.

4. The air circulation device of claim 3, further comprising:

a person detector configured to detect a position of a person, the air circulation device being operable in a third mode in which the vortex ring is blown toward the person detected by the person detector.

5. The air circulation device of claim 2, further comprising:

a person detector configured to detect a position of a person, the air circulation device being operable in a third mode in which the vortex ring is blown toward the person detected by the person detector.

6. The air circulation device of claim 1, wherein the air circulation device is operable in a second mode in which the vortex ring blown from the air circulation device disappears before reaching the wall surface of the room.

7. The air circulation device of claim 6, further comprising:

a person detector configured to detect a position of a person, the air circulation device being operable in a third mode in which the vortex ring is blown toward the person detected by the person detector.

8. The air circulation device of claim 1, further comprising:

a person detector configured to detect a position of a person, the air circulation device being operable in a third mode in which the vortex ring is blown toward the person detected by the person detector.

* * * * *